(12) United States Patent
Wu et al.

(10) Patent No.: US 9,174,183 B2
(45) Date of Patent: Nov. 3, 2015

(54) FLUIDIZED BED POLYMERIZATION REACTOR AND PROCESS FOR PREPARING POLYMER

(75) Inventors: Wenqing Wu, Beijing (CN); Yongrong Yang, Zhejiang (CN); Guanghai Luo, Beijing (CN); Jingdai Wang, Zhejiang (CN); Binbo Jiang, Zhejiang (CN); Shufang Wang, Beijing (CN); Guodong Han, Beijing (CN)

(73) Assignees: China Petroleum & Chemical Corporation, Beijing (CN); Zhejiang University, Hangzhou, Zhejiang (CN); Sinopec Engineering Incorporation, Beijing (CN)

( * ) Notice: Subject to any disclaimer, the term of this patent is extended or adjusted under 35 U.S.C. 154(b) by 0 days.

(21) Appl. No.: 13/876,621

(22) PCT Filed: Sep. 29, 2011

(86) PCT No.: PCT/CN2011/001651
§ 371 (c)(1),
(2), (4) Date: Nov. 19, 2014

(87) PCT Pub. No.: WO2012/041017
PCT Pub. Date: Apr. 5, 2012

(65) Prior Publication Data
US 2015/0099854 A1    Apr. 9, 2015

(30) Foreign Application Priority Data

Sep. 29, 2010    (CN) .......................... 2010 1 0299786

(51) Int. Cl.
*C08F 2/34*    (2006.01)
*B01J 8/24*    (2006.01)
(Continued)

(52) U.S. Cl.
CPC *B01J 8/32* (2013.01); *B01J 8/1827* (2013.01); *B01J 8/1863* (2013.01); *B01J 8/22* (2013.01);
(Continued)

(58) Field of Classification Search
USPC ........................ 526/65, 68, 918; 422/132, 140
See application file for complete search history.

(56) References Cited

U.S. PATENT DOCUMENTS

| 4,379,758 A | 4/1983 | Wagner et al. |
| 4,383,095 A | 5/1983 | Goeke et al. |

(Continued)

FOREIGN PATENT DOCUMENTS

| CN | 1424333 A | 6/2003 |
| CN | 1749287 A | 3/2006 |

(Continued)

OTHER PUBLICATIONS

International Search Report mailed Jan. 5, 2012, issued in International Patent Application No. PCT/CN2011/001651 (Publication No. WO 2012/041017).

(Continued)

*Primary Examiner* — Fred M Teskin
(74) *Attorney, Agent, or Firm* — Finnegan, Henderson, Farabow, Garrett & Dunner, LLP (57) ABSTRACT

The invention provides a fluidized bed polymerization reactor, including: a column, in which a liquid distributor and a gas distributor above the liquid distributor are arranged, so that the reaction zone being divided into a first zone and a second zone through the gas distributor; and a circulating unit for circulating the gas material originated from the top zone of the column into the bottom zone thereof in a form of gas-liquid mixture. The gas-liquid mixture is undergone a gas-liquid separation in the bottom zone, the gas phase portion obtained being fed to the gas distributor and then into the second zone while the liquid phase portion obtained being entered into the first zone through the liquid distributor, so that the temperature in the first zone is lower than that in the second zone. Therefore, polymer with a molecular weight distributed in a relatively wide range can be obtained. The invention further provides a method for preparing polymer.

32 Claims, 3 Drawing Sheets

(51) Int. Cl.
*B01J 8/32* (2006.01)
*B01J 8/18* (2006.01)
*B01J 8/22* (2006.01)
*C08F 2/01* (2006.01)
*C08F 10/00* (2006.01)

(52) U.S. Cl.
CPC ... *B01J 8/24* (2013.01); *C08F 2/01* (2013.01); *B01J 2208/00274* (2013.01); *B01J 2208/00283* (2013.01); *B01J 2208/00991* (2013.01)

(56) References Cited

U.S. PATENT DOCUMENTS

| | | | |
|---|---|---|---|
| 4,876,320 A | 10/1989 | Fulks et al. | |
| 7,482,411 B2 * | 1/2009 | Penzo et al. | 526/70 |
| 7,851,567 B2 | 12/2010 | Andtsjoe et al. | |

FOREIGN PATENT DOCUMENTS

| | | |
|---|---|---|
| CN | 1788023 A | 6/2006 |
| CN | 1923861 A | 3/2007 |
| CN | 101284889 A | 10/2008 |
| WO | WO 2004/092228 A1 | 10/2004 |
| WO | WO 2009/076733 A1 | 6/2009 |
| WO | WO 2010/045091 A2 | 4/2010 |

OTHER PUBLICATIONS

Written Opinion mailed Jan. 5, 2012, issued in International Patent Application No. PCT/CN2011/001651 (Publication No. WO 2012/041017).

* cited by examiner

FLUIDIZED BED POLYMERIZATION REACTOR AND PROCESS FOR PREPARING POLYMER

CROSS REFERENCE TO RELATED APPLICATIONS

This application is a national phase application based on PCT/CN2011/001651, filed Sep. 29, 2011, which claims the priority of Chinese Patent Application No. 201010299786.3, filed Sep. 29, 2010, the contents of both of which are incorporated herein by reference.

TECHNICAL FIELD

The invention relates to a fluidized bed polymerization reactor for olefin polymerization, and a process for preparing polymer.

BACKGROUND

It is well known that olefin will generate polymer with a relatively high molecular weight at a relatively low temperature, while generate polymer with a relatively low molecular weight at a relatively high temperature. On the other hand, the activity of catalyst is a function of the reaction temperature. If in one single reactor the reaction temperature is controlled to change the molecular weight of polymer obtained, the speed of polymerization reaction will be generally out of control. Therefore, no matter in the laboratory experiment or in the commercial application, the temperature in any type of polymerization reactors has to be maintained relatively constant. In particular, for olefin polymerization process in the commercial application, whether the polymerization reaction temperature is constant or not directly determines continuity of the process or possibility of any accident that would be caused.

Figure 1:
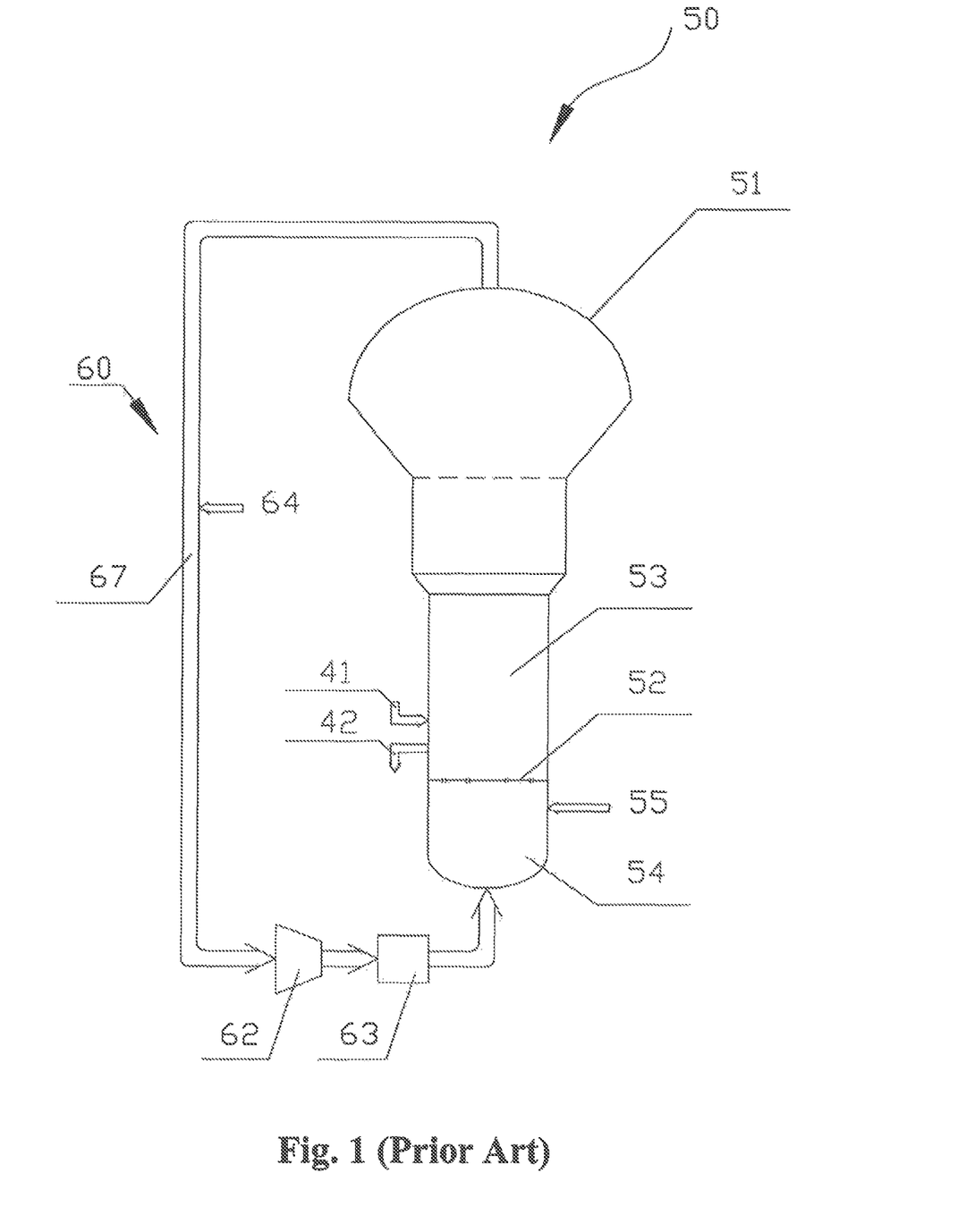
FIG. 1 shows the schematic structure of a conventional fluidized bed polymerization reactor according to the prior art.

Therefore, for a long time it is believed that an even distribution of temperature in a fluidized bed polymerization reactor is of vital importance for controlling the polymerization process and stabilizing the quality of polymers obtained. FIG. 1 schematically shows a conventional fluidized bed polymerization reactor 50, which includes a column 51 and a circulating unit 60 arranged outside of the column 51. A liquid distributor 52 is arranged inside the column 51, and divides the column 51 into an upper zone (i.e., reaction zone) 53 and a lower zone 54. The circulating unit 60 includes a hydrogen source 64, a compressor 62 and a cooler 63, which are connected together in series by means of a suitable line 67. The circulating unit 60 is connected to the column top at one end, and to the column bottom at the other end. In reaction, monomer is fed to the lower zone 54 from a feeding port 55, and, after passing through the liquid distributor 52, enter into the reaction zone 53, where the monomer begins to react in the presence of suitable catalyst. The gas product generated in the column 51 flows into the circulating unit 60 from the column top, and is mixed with hydrogen from the hydrogen source 64. Afterward, the mixture is compressed by the compressor 62 and cooled by the cooler 63, forming a gas-liquid mixture. The gas-liquid mixture is then delivered to the lower zone 54, and enters into the reaction zone 53 through the liquid distributor 52. The temperature in the reaction zone 53 of the column 51 is maintained constant. For example, in U.S. Pat. No. 4,379,758, U.S. Pat. No. 4,383,095 and U.S. Pat. No. 4,876,320 etc. a similar fluidized bed polymerization reactor is disclosed, which comprises a closed circulating loop consisting of a fluidized bed reactor, a circulating gas compressor and a circulating gas cooler. The circulating gas containing reactor monomer (e.g., ethylene, α-olefin), hydrogen and nitrogen is circulated in the loop, and the polymerization temperature in the whole reactor is controlled at a certain constant value. However, with one single catalyst and a constant polymerization temperature in single reactor, only polymer with a molecular weight distributed in a relatively narrow range will be generated by olefin polymerization.

In order to improve the physical property or processing property of the polymer products, researchers have been trying to develop advanced process and technology. In the conventional olefin polymerization reactor and the process thereof, typically two or more reactors connected with each other in series are used, so that the polymer generated by olefin polymerization has a bi-model or broad molecular weight distribution. That is to say, under different reaction temperatures or gas components, the olefin polymerization can generate polymer with different molecular weights, thus widening the distribution of molecular weight. For example, WO 2009/076733A1 discloses an olefin polymerization reaction is carried out in two reactors arranged in a serial configuration, wherein polymer with a relatively low molecular weight is generated at a relatively high temperature in the first reactor, while polymer with a relatively high molecular weight is generated at a relatively low temperature in the second reactor. However, with regard to this type of in-series reactors, the reaction process is complex, the equipment is costly, the operation is difficult, and the continuous stability is poor.

SUMMARY OF THE INVENTION

The invention aims to provide a fluidized bed polymerization reactor for olefin polymerization, which can generate polymer with broad molecular weight distributed in a single reactor, and achieve an optimized balance between the processing property and physical property of polymer obtained. The invention further aims to provide a corresponding method for preparing polymer.

According to the first aspect of the invention, a fluidized bed polymerization reactor is provided, which includes: a column, in which a liquid distributor and a gas distributor above the liquid distributor are arranged, wherein liquid reactant is fed into a bottom zone in the column under the liquid distributor, and enters into a reaction zone above the liquid distributor after passing through the liquid distributor, the reaction zone being divided into a first zone under the gas distributor and a second zone above the gas distributor; and a circulating unit for circulating the gas material originated from the top zone of the column into the bottom zone thereof in a form of gas-liquid mixture. The gas-liquid mixture is undergone a gas-liquid separation in the bottom zone, the gas phase portion obtained being fed to the gas distributor and then into the second zone while the liquid phase portion obtained being entered into the first zone through the liquid distributor, so that the temperature in the first zone is lower than that in the second zone.

According to the invention, the first zone in the reactor column is supplied with liquid phase component while the second zone therein is supplied with gas phase component. Therefore, liquid phase component is gasified in the lower, first zone and removes the polymerization reaction heat, thus maintaining the first zone as a polymerization reaction zone at a relatively low temperature. In comparison, gas phase component enters into the second zone and removes the polymerization reaction heat, thus maintaining the second zone as another polymerization reaction zone at a relatively high temperature. In this manner, two reaction zones with different temperatures are formed in the reactor column. In an embodiment, the temperature in the first zone is lower than that in the second zone by at least 10° C., preferably 10-40° C., more preferably 15-35° C. With two reaction zones of different temperatures being formed in the reactor column, polymer with a molecular weight distributed in a relatively wide range can be obtained.

With the fluidized bed polymerization reactor according to the invention, polymer obtained will have a molecular weight dispersion (the ratio of weight average molecular weight to number average molecular weight) of 5-26 and a viscosity-average molecular weight of 0.01-16 million.

According to an embodiment, an impermeable first separator is provided under the liquid distributor so that a liquid phase chamber is formed between the liquid distributor and the first separator. The liquid reactant is fed into the liquid phase chamber and the gas-liquid mixture is undergone a gas-liquid separation in the area between the bottom of the column and the first separator. The separated liquid phase portion is fed into the liquid phase chamber.

According to a preferred embodiment, a permeable second separator is provided under the first separator, so that a gas-liquid separation chamber is formed between the first separator and the second separator and a liquid sedimentation chamber is formed between the second separator and the bottom of the column. Advantageously, the gas-liquid separation chamber communicates with the circulating unit on one hand and with the gas distributor on the other hand. Therefore, the gas-liquid mixture from the circulating unit is undergone a gas-liquid separation in the gas-liquid separation chamber. The separated gas phase portion flows to the gas distributor, and thus to the second zone.

In an embodiment, the liquid sedimentation chamber communicates with the liquid phase chamber, preferably through a line inside the column and/or a line outside the column. Therefore, the liquid phase portion separated in the gas-liquid separation chamber will enter into the liquid sedimentation chamber after passing through the permeable second separator, and then enter into the liquid chamber.

According to a preferred embodiment, the liquid phase chamber communicates with a liquid sprayer arranged in the first zone, so that at least a part of liquid phase portion from the liquid phase chamber can be sprayed into the first zone by means of the liquid sprayer. Preferably, the at least a part of liquid phase portion from the liquid phase chamber is sprayed into the first zone in an atomizing form, thus further reducing the temperature in the first zone. Consequently, the temperature difference between the first and second zones is further increased. In a particular example, the at least a part of liquid phase portion from the liquid phase chamber is fed to the liquid sprayer through a valve. By means of the valve, the temperature in the first zone can be suitably adjusted, thus further increasing the temperature difference between the first zone and the second zone.

In a preferred embodiment, the diameter of the second zone is larger than that of the first zone. Advantageously, the diameter ratio of the second zone to the first zone is within the range of 1:0.5-0.99, preferably 1:0.6-0.8.

In a preferred embodiment, the volume ratio of the liquid phase chamber, the gas-liquid separation chamber and the liquid sedimentation chamber is 1:(5-20):(1-6), preferably 1:(6-15):(2-4).

In a preferred embodiment, the vertical distance between the liquid sprayer and the liquid distributor is of 50-100%, preferably 60-100%, and more preferably 70-100% of the whole length of the first zone (i.e., the vertical distance between the gas distributor and the liquid distributor).

According to the invention, the height of the second zone, the vertical distance between the liquid sprayer and the liquid distributor, the vertical distance between the liquid distributor and the bottom of the column, and the whole length of the column 1 meets the ratio relationship of (4-5.5):(1.5-3):(0.5-1.5):10.

Preferably, in the gas-liquid mixture output from the circulating unit, content of the liquid phase portion is e.g. 20-70% wt, preferably 25-60% wt. In this way, polymer with a molecular weight distributed in a relatively wide range can be obtained.

According to the second aspect of the invention, a method for preparing polymer is provided, including: enabling reactant containing monomer to polymerize in a first zone of the column of a fluidized bed polymerization reactor in the presence of catalyst, generating a first solid polymer material; enabling the reactant containing monomer to flow upwardly in the column, enter into a second zone of the column of the fluidized bed polymerization reactor and then generate a second solid polymer material in the presence of catalyst; enabling the reactant containing monomer to form a gas-liquid mixture in a circulating unit outside the fluidized bed polymerization reactor, the gas-liquid mixture being fed to the bottom zone of the column for gas-liquid separation, wherein the liquid phase portion separated is delivered to the first zone while the gas phase portion separated is delivered to the second zone; the first solid polymer material mixes with the second solid polymer material so as to form the final polymer; wherein the temperature in the second zone is higher than that in the first zone.

According to the invention, with the liquid phase portion separated being delivered to the first zone for further reaction while the gas phase portion separated being delivered to the second zone for further reaction, two reaction zones with different temperatures are formed in the reactor column, so that polymer with a molecular weight distributed in a relatively wide range can be obtained. At the same time, the reactant containing monomer is circulated in the process, so that monomer (and other possible components therein) that are not sufficiently reacted can be fully utilized.

Preferably, the method according to the invention is carried out by means of the fluidized bed polymerization reactor according to the first aspect of the invention.

In a preferred embodiment, in the first zone the reaction temperature may be 50-70° C., the reaction pressure may be 0.5-3 Mpa and the reaction time may be 0.5-20 s. In the second zone the reaction temperature may be 65-100° C., the reaction pressure may be 0.5-3 Mpa and the reaction time may be 0.4-15 s.

In an example, the catalyst used in the first zone can be the same as or different from that used in the second zone. The catalyst can be at least one selected from the group consisting of Ziegler-Natta catalyst, metallocene catalyst and non-metallocene catalyst. In the case of the catalyst being Ziegler-Natta catalyst, the method further includes adding cocatalyst into the first zone and/or the second zone.

In an example, the monomer includes ethylene and $\alpha$-olefin, wherein the mol ratio of ethylene to $\alpha$-olefin may be 1:0.01-0.8, preferably 1:0.1-0.5. The $\alpha$-olefin can be at least one selected from the group consisting of propylene, 1-butylene, 1-amylene, 1-hexene, 1-heptene and 1-octene.

In an example, the gas phase portion separated from the gas-liquid mixture contains hydrogen acting as blocking agent, and at least one of gaseous monomer and inert gas. There is much hydrogen acting as blocking agent existing in the second zone than that in the first zone. Therefore, polymer with a relatively low molecular weight would be generated in the second zone, while polymer with a relatively large molecular weight would be generated in the first zone.

In an example, the reactant containing monomer further contains inert hydrocarbon, which can be at least one selected from n-pentane, isopentane, cyclopentane, hexane and heptane. The mol ratio of the inert hydrocarbon to the monomer can be 0.05-0.5:1.

BRIEF DESCRIPTION OF DRAWINGS

In the following the invention will be described with reference to the attached drawings. However, it should be noted that the drawings are provided to facilitate the understanding of the invention only, and does not limit the invention in any manner.

In the drawings.

SPECIFIC EMBODIMENTS OF THE INVENTION

Figure 2:
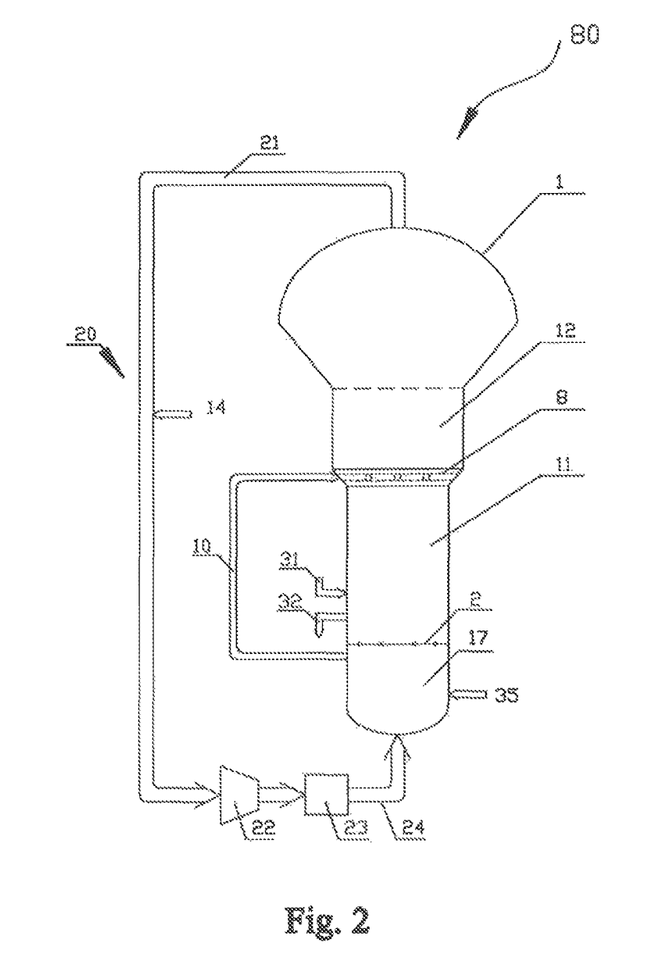
FIG. 2 shows the schematic structure of a fluidized bed polymerization reactor according to an embodiment of the invention.

FIG. 2 shows an embodiment of the invention. As shown in FIG. 2, the fluidized bed polymerization reactor 80 according to the invention includes a reactor column 1 and a circulating unit 20 arranged outside of the column. The column 1 may have a shape of cylinder or cone.

The circulating unit 20 includes a compressor 22 connecting to the top of the column 1 through line 21, and a cooler 23 connecting to the compressor 22 at one end and to the bottom of the column 1 through line 24 at the other end. The circulating unit 20 further includes a blocking agent source 14 arranged in the line 21, for providing blocking agent (here is hydrogen as an example) into the material circulating in the circulating unit 20. The compressor 22 and the cooler 23 function to adjust the temperature and pressure of the circulating material from the reactor column 1 within a suitable range, so that the liquid content in the output material is controlled within a certain range on one hand and the temperature of the output material is maintained within a suitable range on the other hand. The compressor 22 can be a reciprocating compressor, a centrifugal compressor or a screw compressor, and is preferably a screw compressor. As a non-limiting example, the net pressure increase of the compressor 22 is 0.3-1.5 MPa, and preferably 0.5-1.0 MPa, while the net temperature increase thereof is less than 30° C., preferably less than 20° C., and more preferably less than 10° C. The cooler 23 can be a double pipe type cooler or a fixed pipe plate cooler, and is preferably a fixed pipe plate cooler. The cooling medium used in the cooler can be water or chemical coolant, and is preferably water. Therefore, the reactor column 1, the blocking agent source (i.e., hydrogen source) 14, the compressor 22 and the cooler 23 are connected in series through lines (including the line 21, 24 and other necessary lines), forming a circulating loop outside the column. According to an embodiment, the gas speed of the circulating material in the loop can be 5-20 m/s, preferably 12-15 m/s. The structure, arrangement and design parameters of these components are known to one skilled in the art, and the detailed description thereof are omitted here for the sake of conciseness.

In the reaction column 1 there is arranged a liquid distributor 2, which divides the inner space of the reaction column 1 into an upper zone (i.e. the reaction zone) above the liquid distributor 2 and a lower zone 17 below the liquid distributor 2. According to the invention, in the reaction column 1 there is further arranged a gas distributor 8 above the liquid distributor 2. Therefore, through the gas distributor 8, the reaction zone is divided into a first zone 11 under the gas distributor 8 and a second zone 12 above the gas distributor 8.

The liquid distributor 2 can be any traditional liquid distributor, e.g., a plate with a plurality of through holes. The through holes in the liquid distributor 2 may, for example, have a diameter of 1-5 mm, preferably 2.5-4 mm. The distance between two through holes may be, for example, 80-150 mm, preferably 100-120 mm. In a preferred embodiment, the liquid distributor 2 is designed such that the injecting capability of the liquid distributor 2 amounts to 10-90% wt, preferably 40-60% wt of the circulating material outside of the fluidized bed reactor column 1.

The gas distributor 8 is preferably comprised of a plurality of pipes in parallel or in staggering arrangement, each of the pipes being provided with a plurality of holes. The diameter of the pipe can be 10-50 mm, and preferably 10-25 mm. The holes in the pipes may have a diameter of, e.g., 1-5 mm, and are spaced with each other at a distance of 50-150 mm. The distance between two pipes may be 50-200 mm, and preferably 120-180 mm. Advantageously, the orientation of hole in the pipe forms an angle of 0-90°, preferably 60-90° with respect to the longitudinal axis of the column 1. In a preferred embodiment, the gas distributor 8 is designed such that the injecting capability of the gas distributor 8 amounts to 10-90% wt, preferably 40-60% wt of the outside circulating materials of the fluidized bed reactor column 1. In a preferred implementing mode, the gas distributor 8 is mounted along the radial direction of the reaction column 1. It is understood that the particular structures of the liquid distributor 2 and the gas distributor 8 can be suitably adjusted or modified by one skilled in the art according to the actual application.

According to the invention, monomer in liquid phase is fed to the lower zone 17 of the reaction column 1 via a feeding port 35, and then passes through the liquid distributor 2 to enter into the first zone 11, where the polymerization reaction takes place e.g. in the presence of suitable catalysts. The gas material generated in the column flows into the circulating unit 20 from the top of the column 1, and is mixed with hydrogen supplied from the hydrogen source 14. Afterwards, the mixture forms a gas-liquid mixture after passing through the compressor 22 and the cooler 23, and then is output to the lower zone 17, where the gas-liquid mixture is undergone a gas-liquid separation. The separated gas phase portion is output to the gas distributor 8 e.g. through a line 10, and therefore enters into the second zone 12 of the reaction column 1; while the separated liquid phase portion enters into the first zone 11 through the liquid distributor 2.

Therefore, according to the invention, the reaction zone in the reaction column 1 is divided into two parts by the gas distributor 8, wherein the first zone 11 is supplied with liquid phase component while the second zone 12 is supplied with gas phase component. In this manner, the temperature in the first zone 11 is lower than that in the second zone 12. Therefore, the polymerization reaction in the first zone 11 will generate polymer with a relatively high molecular weight, while the polymerization reaction in the second zone 12 will generate polymer with a relatively lower molecular weight. Therefore, polymer with a molecular weight distributed in a relatively wide range can be obtained, thus significantly improving the properties of polymer production.

It is easily understood that necessary pumps or suction means can be arranged at suitable places in the line 10 or other positions, in order to facilitate conveyance of the gas phase portion to the gas distributor 8.

Figure 3:
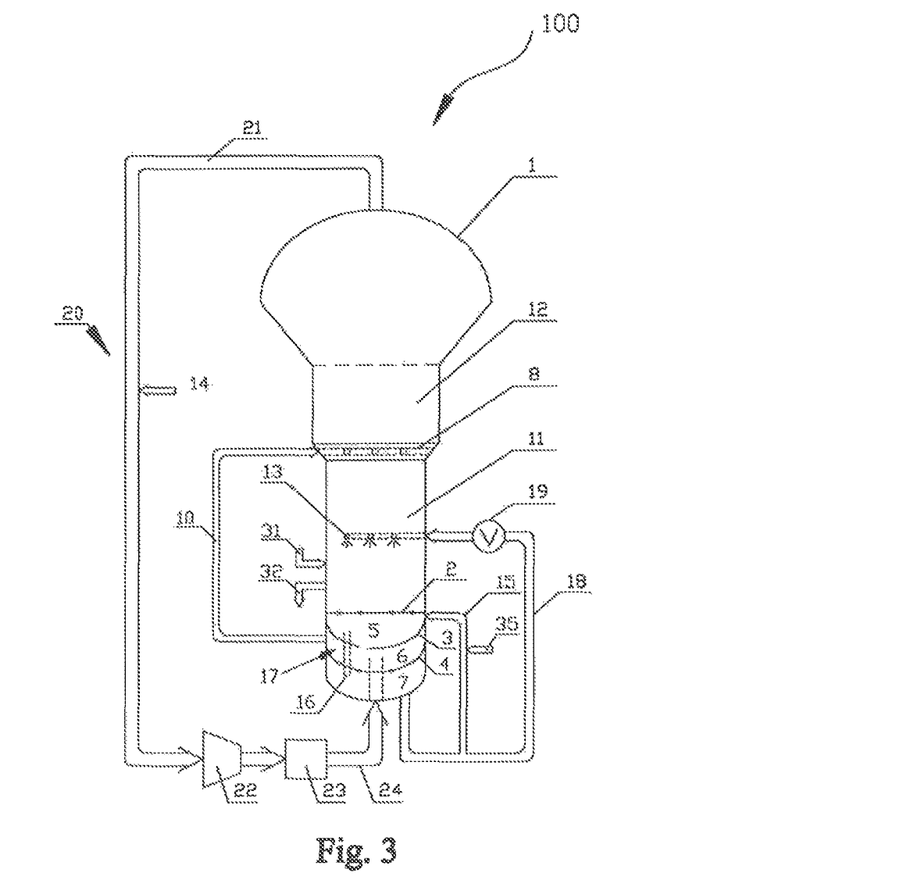
FIG. 3 shows the schematic structure of a fluidized bed polymerization reactor according to another embodiment of the invention.

FIG. 3 shows another embodiment according to the invention. In this embodiment, a first separator 3 is provided in the lower zone 17 between the liquid distributor 2 and the bottom of the column 1. The first separator 3 is an impermeable separator, i.e., liquid and gas cannot permeate from one side of the separator to the other side. The first separator 3 is, for example, an impermeable separator made in any materials generally used in this technical field. For example, it can be made of stainless steel, alloy or plastics. Therefore, a first chamber 5 functioning as the liquid phase chamber is formed between the liquid distributor 2 and the first separator 3.

In reaction, monomer in liquid phase is fed to the first chamber 5 via the feeding port 35, and then enters through the liquid distributor 2 into the first zone 11, where the reaction takes place. The gas material generated flows into the circulating unit 20 from the top of the column 1, and is mixed with hydrogen from the hydrogen source 14. Then, the mixture forms a gas-liquid mixture after passing through the compressor 22 and the cooler 23, and then is output to the area between the first separator 3 and the bottom of the column 1, where the gas-liquid mixture is undergone a gas-liquid separation. The separated gas phase portion is output to the gas distributor 8, and therefore enters into the second zone 12 of the reaction column 1; while the separated liquid phase portion enters into the first chamber 5 e.g. through lines, and then into the first zone 11 through the liquid distributor 2.

It would be easily understood that the temperature in the first zone 11 is lower than that in the second zone 12 with this kind of arrangement. Therefore, polymer with a molecular weight distributed in a relatively wide range can be obtained, thus significantly improving the properties of polymer production.

According to a preferred embodiment of the invention, a second separator 4 is additionally arranged between the first separator 3 and the bottom of the column 1. The second separator 4 is a permeable separator, i.e., liquid and gas can permeate from one side of the separator to the other side. The second separator 4 is, for example, any conventional permeable separator, and preferably a grid or a filter. In an example, the grid or the filter may have a size of 5-20 mesh. Therefore, a second chamber 6 is formed between the first separator 3 and the second separator 4, and a third chamber 7 is formed between the second separator 4 and the bottom of the column 1. The second chamber 6 functions as a gas-liquid separation chamber while the third chamber 7 functions as a liquid sedimentation chamber.

According to the invention, the first chamber 5 communicates with the third chamber 7, and the second chamber 6 communicates, on one hand, with the gas distributor 8, and on the other hand, with the circulating unit 20. In the embodiment shown in FIG. 3, the first chamber 5 communicates with the third chamber 7 through suitable lines, which can be an inner line 16 inside the reaction column 1 or an outer line 15 outside the reaction column 1, or the combination thereof. The second chamber 6 communicates with the gas distributor 8 through the line 10. As shown in FIG. 3, the output line 24 of the circulating unit 20 passes through the third chamber 7 into the second chamber 6; however, it can directly enter into the second chamber 6 from outside of the column 1.

According to the embodiment, monomer in liquid phase is fed to the first chamber 5 via the feeding port 35, and then enters through the liquid distributor 2 into the first zone 11 of the reaction column 1, where the polymerization reaction takes place with the presence of suitable catalysts. The gas material generated flows into the circulating unit 20 from the top of the column 1, and is mixed with hydrogen from the hydrogen source 14. Then, the mixture forms a gas-liquid mixture after passing through the compressor 22 and the cooler 23, and then is output to the second chamber 6, where the gas-liquid mixture is undergone a gas-liquid separation. The separated gas phase portion is output to the gas distributor 8 through the line 10, and therefore enters into the second zone 12 of the reaction column 1; while the separated liquid phase portion enters through the second permeable separator 4 into the third chamber 7, where sedimentation of liquid takes place. The subsided liquid phase portion enters into the first chamber 5 through the line 16 and/or the line 15.

Therefore, according to the invention, the reaction zone in the reaction column 1 is divided into two parts by the gas distributor 8, wherein the first zone 11 is supplied with liquid phase component while the second zone 12 is supplied with gas phase component. In this manner, the temperature in the first zone 11 is lower than that in the second zone 12. Therefore, the polymerization reaction in the first zone 11 will generate polymer with a relatively high molecular weight, while the polymerization reaction in the second zone 12 will generate polymer with a relatively lower molecular weight. Therefore, polymer with a molecular weight distributed in a relatively wide range can be obtained, thus significantly improving the properties of polymer production.

Although polymer with a molecular weight varied in a relatively wide range can be obtained as long as the temperature in the second zone 12 is greater than that in the first zone 11, the temperature in the second zone 12 would be advantageously greater than that in the first zone 11 by at least 10° C., in order to increase the molecular weight dispersion of the polymer obtained. The temperature in the second zone 12 can be greater than that in the first zone 11 by e.g. 10-40° C., and preferably by 15-35° C. In a non-limiting example, in the first zone 11 the reaction temperature may be 50-70° C., the reaction pressure may be 0.5-3 Mpa and the reaction time may be 0.5-20 s. In comparison, in the second zone 12 the reaction temperature may be 65-100° C., the reaction pressure may be 0.5-3 Mpa and the reaction time may be 0.4-15 s.

In the invention, the first zone 11 and the second zone 12 of the reactor column 1 can have different diameters from each other. Since the first zone 11 is supplied with liquid phase component while the second zone 12 is supplied with gas phase component, the diameter of the second zone 12 is preferably greater than that of the first zone 11. For example, the diameter ratio of the second zone 12 to the first zone 11 may be 1:0.5-0.99, preferably 1:0.6-0.8.

The first zone 11 and the second zone 12 can have the same or different fluidized gas velocity. When the fluidizing bed reactor is operated at a non-condensed mode, the fluidized gas velocity is generally 0.05-0.8 m/s, preferably 0.1-0.5 m/s. When the fluidized bed reactor is operated at a condensed mode, the fluidized gas velocity of the first zone 11 may be e.g. 0.01-0.1 m/s, preferably 0.02-0.05 m/s, while that of the second zone 12 may be e.g. 0.1-0.8 m/s, preferably 0.2-0.5 m/s.

In a preferred embodiment, the third chamber 7 is further connected to the first zone 11 through an outside line. As shown in FIG. 3, the line 15 from the third chamber 7 to the first chamber 5 communicates with a line 18 extending from the first zone 11. A liquid sprayer 13 is arranged at the end of the line 18 located within the first zone 11. The liquid sprayer 13 is provided with a plurality of spraying ports, which are preferably oriented toward the bottom of the column 1. In this case, the liquid from the third chamber 7 can be sprayed, in an atomizing form, into the first zone 11 of the column 1 by means of the liquid sprayer 13, and be gasified rapidly. Therefore, the temperature of the reactant in the first zone 11 will be decreased. In this way, according to the preferred embodiment, the temperature difference between the first zone 11 and the second zone 12 can be further increased during the preparation of polymer, thus obtaining polymer with a molecular weight distributed in a larger range.

The liquid sprayer 13 can be any type of conventional liquid sprayers used in the field, and is preferably a spraying atomizer. The liquid sprayer 13 can be mounted along the axis or radial direction of the reactor column 1, preferably along the axis, more preferably the central axis, of the reactor column 1. In a preferred example, a valve 19 is arranged in the line 18. The temperature in the first zone 11 can be suitably adjusted by means of controlling the valve 19, thus further increasing the temperature difference between the first zone 11 and the second zone 12.

Advantageously, the vertical distance between the liquid sprayer 13 and the liquid distributor 2 is 50-100% of the whole length of the first zone 11 (i.e., the vertical distance between the gas distributor 8 and the liquid distributor 2), and is preferably 60-100% thereof, more preferably 70-100% thereof.

According to the invention, the height of the second zone 12, the vertical distance between the liquid sprayer 13 and the liquid distributor 2, the vertical distance between the liquid distributor 2 and the bottom of the column 1, and the whole length of the column 1 (i.e., the vertical distance between the top and the bottom of the column 1) preferably meets the following ratio relationship: i.e., (4-5.5):(1.5-3):(0.5-1.5): 10.

Advantageously, the liquid phase portion is of 20-70% wt, preferably 25-60% wt of the gas-liquid mixture output from the circulating unit 20.

According to the invention, the volume ratio of the first chamber 5, the second chamber 6 and the third chamber 7 can be 1:(5-20):(1-6), preferably 1:(6-15):(2-4). The operation pressure in the liquid phase chamber is set as being higher than the reaction pressure in the first zone 11 by 0.2-1.0 Mpa, preferably 0.3-0.7 Mpa, in order to spray the liquid phase portion into the first zone 11.

The invention further provides a method for preparing polymer, including: enabling reactant containing monomer to polymerize in a first zone of the column of the fluidized bed polymerization reactor in the presence of catalyst, generating a first solid polymer material; enabling the reactant containing monomer to flow upwardly in the column, enter into a second zone of the column of the fluidized bed polymerization reactor, and then generate a second solid polymer material in the presence of catalyst; enabling the reactant containing monomer to form a gas-liquid mixture in a circulating unit outside the fluidized bed polymerization reactor, the gas-liquid mixture being fed to the bottom zone of the column for gas-liquid separation, wherein the liquid phase portion separated is delivered to the first zone while the gas phase portion separated is delivered to the second zone; the first solid polymer material mixes with the second solid polymer material so as to form the final polymer; wherein the temperature in the second zone is higher than that in the first zone.

According to the method of the invention, the weight ratio of monomer to catalyst can be 1:0.00001-0.001, preferably 1:0.0001-0.0008, while mol ratio of monomer to hydrogen can be 1:0.00001-0.01, preferably 1:0.001-0.009.

In the invention, monomer can be any material that can be reacted for polymerization, and is preferably olefin of C1 to C10. More preferably, the monomer can be ethylene and/or α-olefin. In this case, the mol ratio of ethylene to α-olefin may be 1:0.01-0.8, preferably 1:0.1-0.5. The α-olefin can be at least one selected from the group consisting of propylene, 1-butylene, 1-amylene, 1-hexene, 1-heptene and 1-octene.

In the invention, the polymerization catalyst can be varied as the monomer used in the fluidized bed polymerization reactor changes. In addition, the catalyst used in the first zone 11 of the reactor column 1 can be the same as or different from that used in the second zone 12. Generally speaking, the polymerization catalyst can be at least one selected from the group consisting of Ziegler-Natta catalyst, metallocene catalyst and non-metallocene catalyst, preferably Ziegler-Natta catalyst. The Ziegler-Natta catalyst can be any one of traditional Ziegler-Natta catalysts. Preferably, the Ziegler-Natta catalyst is a catalyst with titanium chloride loaded on magnesium chloride. More preferably, in the catalyst, the content of magnesium chloride is 88-92% wt, while the content of titanium chloride is 8-12% wt.

In the case of the polymerization catalyst being Ziegler-Natta catalyst, cocatalyst can be added into the reaction zone (i.e., the first zone 11 and the second zone 12). The cocatalyst can be at least one selected from the group consisting of alkylaluminum compound, alkyllithium compound, alkylzinc compound and alkylboron compound, preferably alkylaluminum compound. The alkylaluminum compound preferably is at least one selected from the group consisting of triethylaluminium, triisobutylaluminum, and tri-n-hexylaluminium, more preferably triethylaluminium. The mol ratio of aluminium in the cocatalyst to titanium in the Ziegler-Natta catalyst can be (25-300):1, preferably (50-160):1.

In an example, the reactant containing monomer can further contain inert hydrocarbon. In the invention, inert hydrocarbon means hydrocarbon that cannot react with the monomer. Generally speaking, the inert hydrocarbon is C1-C16 hydrocarbon, for example at least one selected from n-pentane, isopentane, cyclopentane, hexane and heptane. The mol ratio of inert hydrocarbon to monomer can be 0.05-0.5:1. In the case that the reactant contains inert hydrocarbon, the whole polymerization reaction can be carried out in a lower pressure through increasing the hew point of the reactant.

The Ziegler-Natta catalyst used in the invention preferably has a relatively long half-life period, so that it can have sufficient catalytic activity in the reactor. For example, the half-life period of the catalyst is 2-6 h, preferably 3-5 h. The catalytic productivity is beyond 1000 Kg-PE/Kg-cat, preferably beyond 3000 Kg-PE/Kg-cat. The average residence time of the Ziegler-Natta catalyst is 1-3 h, preferably 2 h, in the second zone, and 2-5 h, preferably 4 h, in the first zone.

The polymer powder obtained according to the method of the invention has an average particle diameter of 0.2-1.1 μm, preferably 0.5-0.8 μm, a fluidized density of 100-300 kg/m$^3$, preferably 160-230 kg/m$^3$, and a bulk density of 160-450 kg/m$^3$. According to the invention, in the fluidized bed polymerization reactor, polymer with a molecular weight distributed in a relatively wide range is generated in the first and second zones with different temperatures. The polymer obtained has a molecular weight dispersion of 5-26 and a viscosity-average molecular weight of 0.01-16 million, and preferably 0.05-5 million.

In the following the invention will be further discussed with reference to some particular examples.

Example 1

Olefin polymer will be prepared by means of the fluidized bed polymerization reactor 100 as shown in FIG. 3. The fluidized bed polymerization reactor 100 includes a reactor column 1. From the top to the bottom of the column 1 there are arranged a gas distributor 8, a sprayer 13 for spraying atomized liquid, a liquid distributor 2, a impermeable first separator 3 made of stainless steel, and a second separator 4 in a form of filter with a size of 5 mesh. A reaction zone is formed between the liquid distributor 2 and the top of the column.

A liquid phase chamber 5 is formed between the liquid distributor 2 and the first separator 3, a gas-liquid separation chamber 6 is formed between the first separator 3 and the second separator 4, and a liquid phase sedimentation chamber 7 is formed between the second separator 4 and the bottom of the column 1. The liquid phase chamber 5 communicates with the liquid phase sedimentation chamber 7 through an inner line 16 and an outer line 15. The gas-liquid separation chamber 6 communicates with the gas distributor 8 through a line 10. And the liquid phase sedimentation chamber 7 further communicates with the sprayer 13 through a line 18 with a valve 19 arranged therein.

The circulating unit 20 communicates the top of the column with the gas-liquid separation chamber 6. In particular, the circulating unit 20 includes a hydrogen source 14, a compressor 22 and a cooler 23 arranged along the lines (including line 21, 24), so as to output the gas-liquid mixture generated into the gas-liquid separation chamber 6.

The gas distributor 8 is arranged in parallel with the radial direction of the column 1, and is a grid formed by pipes arranged vertically. Each pipe has a diameter of 20 mm, and is provided with a plurality of holes having a diameter of 1-5 mm. The distance between two holes is 50-100 mm, while that between two pipes is 150 mm. The liquid distributor 2 is a stainless steel plate with a plurality of through holes, the diameter thereof being 2.5-4 mm and the distance therebetween being 100-120 mm. The distance from the gas distributor 8 to the top of the column 1 is 500 mm, while that from the gas distributor 8 to the bottom of the column 1 is 760 mm. The first zone 11 of the column 1 has a diameter of 100 mm, while the second zone 12 has a diameter of 150 mm. The distance from the liquid sprayer 13 to the liquid distributor 2 is 300 mm, while that from the liquid distributor 2 to the bottom of the column 1 is 210 mm. The volume ratio of the liquid phase chamber 5, the gas-liquid separation chamber 6 and the liquid phase sedimentation chamber 7 is 1:10:3.

The reaction column 1 is purged by nitrogen under a temperature of 90° C., so that the water content therein is less than 0.1 ppm and the oxygen content is less than 0.5 ppm. Then, 318 g monomer (containing ethylene and 1-hexene with a mol ratio of 1:0.2) is fed to the liquid phase chamber 5 having a temperature of 60° C. through the feeding port 35 and the line 15, and then enters into the reaction zone between the liquid distributor 2 and the top of the column 1 through the liquid distributor 2. Meanwhile, 3.0 g triethylaluminium (commercially obtained from Akzo Company) and 0.106 g Ziegler-Natta catalyst (Type SC-1, commercially obtained from Lide Company, China) are added into the reaction zone through the line 31, so that ethylene and 1-hexene will be reacted with each other for polymerization. The fluidized gas velocity in the reactor column 1 is 0.2 m/s.

The gas material generated in the reaction column 1 flows into line 21, and is mixed with hydrogen (the mol ratio of hydrogen to ethylene is 0.003:1), compressed by the compressor 22 and cooled by the cooler 23. Thus a gas-liquid mixture with the liquid phase being 50% wt is obtained. The gas-liquid mixture is undergone a gas-liquid separation in the gas-liquid separation chamber 6. The obtained gas phase portion flows into the second zone 12 of the reaction zone through the line 10 and the gas distributor 8, while the obtained liquid phase portion enters into the liquid phase sedimentation chamber 7 through the second separator 4. A part of the liquid phase portion enters into the liquid phase 5 through lines 15, 16, while another part thereof enters into the first zone 11 of the reaction zone through the line 18 and the sprayer 13. Therefore, the second zone 12 is maintained at a temperature of 90° C. while the first zone 11 is maintained at a temperature of 60° C. The reaction pressure in the reaction zone is 0.8 MPa.

After 6 h of the reaction, polyolefin powder is discharged through line 32. The polyolefin powder obtained is measured through Gel Permeable Chromatography (GPC). The result is shown in Table 1.

Example 2

Olefin polymer will be prepared by means of the same fluidized bed polymerization reactor 100 as that in Example 1. The preparation procedure includes the following procedures. The reaction column 1 is purged by nitrogen under a temperature of 90° C., so that the water content therein is less than 0.1 ppm and the oxygen content is less than 0.5 ppm. Then, 530 g monomer (containing ethylene and 1-butylene with a mol ratio of 1:0.1) is fed to the liquid phase chamber 5 having a temperature of 60° C. through line 15, and then enters into the reaction zone between the liquid distributor 2 and the top of the column 1 through the liquid distributor 2. Meanwhile, 3.0 g triethylaluminium (commercially obtained from Akzo Company) and 0.106 g Ziegler-Natta catalyst (Type SC-1, commercially obtained from Lide Company, China) are added into the reaction zone through line 31, so that ethylene and 1-hexene can be reacted with each other for polymerization. The fluidized gas velocity in the reactor column 1 is 0.3 m/s.

The gas material generated in the reaction column 1 flows into line 21, and then is mixed with hydrogen (the mol ratio of hydrogen to ethylene is 0.005:1), compressed by the compressor 22 and cooled by the cooler 23. Thus a gas-liquid mixture with the liquid phase being 60% wt is obtained. The gas-liquid mixture is undergone a gas-liquid separation in the gas-liquid separation chamber 6. The obtained gas phase portion flows into the second zone 12 of the reaction zone through line 10 and the gas distributor 8, while the obtained liquid phase portion enters into the liquid phase sedimentation chamber 7. A part of the liquid phase portion enters into the liquid phase 5 through the lines 15, 16, while another part thereof enters into the first zone 11 through the line 18 and the sprayer 13. Therefore, the second zone 12 is maintained at a temperature of 85° C. while the first zone 11 is maintained at a temperature of 58° C. The reaction pressure in the reaction zone is 0.6 MPa.

After 6 h of the reaction, polyolefin powder is discharged through line 32. The polyolefin powder obtained is measured through gel permeable chromatographic column. The result is shown in Table 1.

Example 3

Olefin polymer will be prepared by means of the same fluidized bed polymerization reactor 100 as in Example 1. The preparation procedure includes the following procedures. The reaction column 1 is purged by nitrogen under a temperature of 90° C., so that the water content therein is less than 0.1 ppm and the oxygen content is less than 0.5 ppm. Then, 160 g ethylene is supplied into the liquid phase chamber 5 having a temperature of 60° C. through line 15, and then enters into the reaction zone between the liquid distributor 2 and the top of the column 1 through the liquid distributor 2. Meanwhile, 3.0 g triethylaluminium (commercially obtained from Akzo Company) and 0.106 g Ziegler-Natta catalyst (Type SC-1, commercially obtained from Lide Company, China) are added into the reaction zone through line 31, so that ethylene can be reacted for polymerization. The fluidized gas velocity in the reactor column 1 is 0.4 m/s.

The gas material generated in the reaction column 1 flows into line 21, and then is mixed with hydrogen (the mol ratio of hydrogen to ethylene is 0.009:1), compressed by the compressor 22 and cooled by the cooler 23. Thus a gas-liquid mixture with the liquid phase being 30% wt is obtained. The gas-liquid mixture is undergone a gas-liquid separation in the gas-liquid separation chamber 6. The obtained gas phase portion flows into the second zone 12 of the reaction zone through line 10 and the gas distributor 8, while the obtained liquid phase portion enters into the liquid phase sedimentation chamber 7. A part of the liquid phase portion enters into the liquid phase 5 through lines 15, 16, while another part thereof enters into the first zone 11 through line 18 and the sprayer 13. Therefore, the second zone 12 is maintained at a temperature of 80° C. while the first zone 11 is maintained at a temperature of 65° C. The reaction pressure in the reaction zone is 1.0 MPa.

After 6 h of the reaction, polyolefin powder is discharged through line 32. The polyolefin powder obtained is measured through gel permeable chromatographic column. The result is shown in Table 1.

Comparative Example

Olefin polymer will be prepared by means of the conventional fluidized bed polymerization reactor 50 as shown in FIG. 1. The reactor 50 differs from the reactor 100 in FIG. 3 that none of the gas distributor, the sprayer and the first and second separators are provided in the column 1. Only a liquid distributor 52 is arranged therein. The preparation procedure includes the following procedures. The reaction column 51 is purged by nitrogen under a temperature of 90° C., so that the water content therein is less than 0.1 ppm and the oxygen content is less than 0.5 ppm. Then, 318 g monomer (containing ethylene and 1-hexene with a mol ratio of 1:0.2) is fed to the area between the liquid distributor 52 and the bottom of the column 1 and having a temperature of 60° C., and then enters into the reaction zone between the liquid distributor 52 and the top of the column 1 through the liquid distributor 52. Meanwhile, 3.0 g triethylaluminium (commercially obtained from Akzo Company) and 0.106 g Ziegler-Natta catalyst (Type SC-1, commercially obtained from Lide Company, China) are added into the reaction zone through line 41, so that ethylene and 1-hexene can be reacted with each other for polymerization. The fluidized gas velocity in the reactor column 51 is 0.2 m/s.

The gas material generated in the reaction column 51 flows into line 67, and then is mixed with hydrogen (the mol ratio of hydrogen to ethylene is 0.003:1), compressed by the compressor 62 and cooled by the cooler 63. Then the material enters into the area between the liquid distributor 52 and the bottom of the column 1, and then into the reaction zone through the liquid distributor 52. Therefore, the reaction zone is maintained at a temperature of 90° C. and a reaction pressure of 0.8 MPa.

After 6 h of the reaction, polyolefin powder is discharged through line 42. The polyolefin powder obtained is measured through gel permeable chromatographic column. The result is shown in Table 1.

TABLE 1

| Examples | molecular weight dispersion index | viscosity-average molecular weight |
|---|---|---|
| Example 1 | 12.83 | 3.10 million |
| Example 2 | 5.94 | 3.23 million |
| Example 3 | 5.03 | 3.51 million |
| Comparative Example | 3.23 | 3.05 million |

From Table 1 it can be seen that the molecular weight dispersion index of polymer obtained by the fluidized bed polymerization reactor according to the invention is increased.

It should be understood that although in the foregoing the invention is discussed with the example of dividing the reaction zone into two sub-zones with different temperatures, the invention also includes the variations of the reaction zone having three or more sub-zones with different temperatures. That is to say, dividing the reaction zone into three or more sub-zones with different temperatures also falls within the scope of the invention.

Although in the foregoing the invention is illustrated with reference to some embodiments of the invention, it will be apparent to those skilled in the art that modifications and variations may be made in the invention and the members therein can be replaced with equivalents without departing from the spirit or scope of the invention. In particular, as long as there is no structural conflict, features existed in different embodiments in the invention can be combined with each other in any manner. Only for the sake of conciseness these combinations are not described here in details. It is intended that the invention covers all the modifications and variations thereof provided they come within the scope of the appended claims and their equivalents.

The invention claimed is:

1. A fluidized bed polymerization reactor, comprising:
a column (1), in which a liquid distributor (2) and a gas distributor (8) above the liquid distributor are arranged, wherein liquid reactant fed into a bottom zone in the column under the liquid distributor enters into a reaction zone above the liquid distributor after passing through the liquid distributor, the reaction zone being divided into a first zone (11) under the gas distributor and a second zone (12) above the gas distributor; and
a circulating unit (20) for circulating gas material originated from a top zone of the column into the bottom zone thereof in a form of gas-liquid mixture,
wherein the fluidized bed polymerization reactor is configured so that the gas-liquid mixture undergoes a gas-liquid separation in the bottom zone, the gas phase portion obtained entering into the gas distributor and then into the second zone while the liquid phase portion obtained entering into the first zone through the liquid distributor, so that the temperature in the first zone is lower than that in the second zone.

2. The fluidized bed polymerization reactor according to claim 1, wherein an impermeable first separator (3) is provided under the liquid distributor so that a liquid phase chamber (5) is formed between the liquid distributor and the first separator, wherein the liquid phase chamber receives the liquid reactant fed into the bottom zone in the column under the liquid distributor, and the gas-liquid mixture undergoes a gas-liquid separation in the area between the bottom of the column and the first separator, the liquid phase portion obtained into entering into the liquid phase chamber.

3. The fluidized bed polymerization reactor according to claim 2, wherein a permeable second separator (4) is provided under the first separator so that a gas-liquid separation chamber (6) is formed between the first separator and the second separator, and a liquid sedimentation chamber (7) is formed between the second separator and the bottom of the column.

4. The fluidized bed polymerization reactor according to claim 3, wherein the gas-liquid separation chamber communicates with the circulating unit on one hand and with the gas distributor on the other hand.

5. The fluidized bed polymerization reactor according to claim 3, wherein the liquid sedimentation chamber communicates with the liquid phase chamber through a line inside the column and/or a line outside the column.

6. The fluidized bed polymerization reactor according to claim 2, wherein the liquid phase chamber communicates with a liquid sprayer (13) arranged in the first zone, so that at least a part of liquid phase portion from the liquid phase chamber is sprayed into the first zone by the liquid sprayer.

7. The fluidized bed polymerization reactor according to claim 6, wherein the at least a part of liquid phase portion from the liquid phase chamber enters the liquid sprayer through a valve (19).

8. The fluidized bed polymerization reactor according to claim 1, wherein the circulating unit comprises a hydrogen source (14), a compressor (22), and a cooler (23) connected with each other through a line.

9. The fluidized bed polymerization reactor according to claim 1, wherein the temperature in the first zone is lower than that in the second zone by at least 10° C.

10. The fluidized bed polymerization reactor according to claim 1, wherein the diameter of the second zone is larger than that of the first zone.

11. The fluidized bed polymerization reactor according to claim 10, wherein the diameter ratio of the second zone to the first zone ranges from 1:0.5 to 1:0.99.

12. The fluidized bed polymerization reactor according to claim 6, wherein the vertical distance between the liquid sprayer and the liquid distributor ranges from 50% to 100% of the whole length of the first zone.

13. The fluidized bed polymerization reactor according to claim 6, wherein the height of the second zone, the vertical distance between the liquid sprayer and the liquid distributor, the vertical distance between the liquid distributor and the bottom of the column, and the whole length of the column 1 meets the ratio relationship of (4-5.5):(1.5-3):(0.5-1.5):10.

14. The fluidized bed polymerization reactor according to claim 1, wherein the liquid phase portion ranges from 20% wt to 70% wt of the gas-liquid mixture output from the circulating unit.

15. The fluidized bed polymerization reactor according to claim 3, wherein the volume ratio of the liquid phase chamber, the gas-liquid separation chamber, and the liquid sedimentation chamber is 1:(5-20):(1-6).

16. The fluidized bed polymerization reactor according to claim 1, wherein the gas distributor comprises a plurality of pipes in a parallel or staggering arrangement, each of the pipes being provided with a plurality of holes.

17. The fluidized bed polymerization reactor according to claim 1, wherein the temperature in the first zone is lower than that in the second zone by at least 10° C. to 40° C.

18. The fluidized bed polymerization reactor according to claim 1, wherein the temperature in the first zone is lower than that in the second zone by at least 15° C. to 35° C.

19. The fluidized bed polymerization reactor according to claim 10, wherein the diameter ratio of the second zone to the first zone ranges from 1:0.6 to 1:0.8.

20. The fluidized bed polymerization reactor according to claim 6, wherein the vertical distance between the liquid sprayer and the liquid distributor ranges from 60% to 100% of the whole length of the first zone.

21. The fluidized bed polymerization reactor according to claim 6, wherein the vertical distance between the liquid sprayer and the liquid distributor ranges from 70% to 100% of the whole length of the first zone.

22. The fluidized bed polymerization reactor according to claim 1, wherein the liquid phase portion ranges from 25% wt to 60% wt of the gas-liquid mixture output from the circulating unit.

23. The fluidized bed polymerization reactor according to claim 3, wherein the volume ratio of the liquid phase chamber, the gas-liquid separation chamber, and the liquid sedimentation chamber is 1:(6-15):(2-4).

24. A method for preparing polymer, comprising:
polymerizing a reactant comprising monomer in the fluidized bed polymerization reactor according to claim 1.

25. A method for preparing polymer, comprising:
polymerizing a reactant comprising monomer in a first zone of the column of a fluidized bed polymerization reactor in the presence of a first catalyst, generating a first solid polymer material;
polymerizing the reactant comprising monomer in a second zone of the column of the fluidized bed polymerization reactor, generating a second solid polymer material in the presence of a second catalyst;
feeding into a bottom zone of the column for gas-liquid separation a gas-liquid mixture of the reactant comprising monomer formed in a circulating unit outside the fluidized bed polymerization reactor, wherein the liquid phase portion separated enters into the first zone while the gas phase portion separated enters into the second zone; and
mixing the first solid polymer material and the second solid polymer material to form the final polymer;
wherein the temperature in the second zone is higher than that in the first zone.

26. The method according to claim 25, wherein in the first zone the reaction temperature ranges from 50° C. to 70° C., the reaction pressure ranges from 0.5 Mpa to 3 Mpa and the reaction time ranges from 0.5 s to 20 s, while in the second zone the reaction temperature ranges from 65° C. to 100° C., the reaction pressure ranges from 0.5 Mpa to 3 Mpa, and the reaction time ranges from 0.4 s to 15 s.

27. The method according to claim 25, wherein the first catalyst used in the first zone is the same as or different from the second catalyst used in the second zone, wherein the first and/or second catalyst is at least one selected from the group consisting of Ziegler-Natta catalyst, metallocene catalyst, and non-metallocene catalyst.

28. The method according to claim 27, wherein the first or second catalyst is Ziegler-Natta catalyst, and the method further comprises adding cocatalyst into the first zone and/or the second zone.

29. The method according to claim 25, wherein the monomer comprises ethylene and $\alpha$-olefin, wherein the mol ratio of ethylene to $\alpha$-olefin ranges from 1:0.01 to 1:0.8, and the $\alpha$-olefin is at least one selected from the group consisting of propylene, 1-butylene, 1-amylene, 1-hexene, 1-heptene, and 1-octene.

30. The method according to claim 25, wherein the gas phase portion separated from the gas-liquid mixture comprises hydrogen acting as a blocking agent, and at least one of gaseous monomer and inert gas.

31. The method according to claim 25, wherein the reactant comprising monomer further comprises inert hydrocarbon, which is at least one selected from n-pentane, isopentane, cyclopentane, hexane, and heptanes, and the mol ratio of the inert hydrocarbon to the monomer ranges from 0.05:1 to 0.5:1.

32. The method according to claim 29, wherein the mol ratio of ethylene to α-olefin ranges from 1:0.1 to 1:0.5.

* * * * *